(12) United States Patent
Russell et al.

(10) Patent No.: US 9,542,672 B2
(45) Date of Patent: *Jan. 10, 2017

(54) SYSTEMS AND METHODS FOR PROVIDING MANUFACTURER-BASED FINANCIAL SERVICE ACCOUNTS

(71) Applicants: Tobias D. Russell, Alexandria, VA (US); Drew Jacobs, Arlington, VA (US); Luke A. Hammock, Washington, DC (US)

(72) Inventors: Tobias D. Russell, Alexandria, VA (US); Drew Jacobs, Arlington, VA (US); Luke A. Hammock, Washington, DC (US)

(73) Assignee: Capital One Financial Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,622

(22) Filed: Nov. 9, 2015

(65) Prior Publication Data

US 2016/0063455 A1    Mar. 3, 2016

Related U.S. Application Data

(63) Continuation of application No. 14/330,506, filed on Jul. 14, 2014, now Pat. No. 9,235,835.

(Continued)

(51) Int. Cl.
*G06Q 20/20* (2012.01)
*G06Q 20/04* (2012.01)
(Continued)

(52) U.S. Cl.
CPC .......... *G06Q 20/0453* (2013.01); *G06Q 20/20* (2013.01); *G06Q 20/204* (2013.01); *G06Q 20/28* (2013.01); *G06Q 20/322* (2013.01)

(58) Field of Classification Search
CPC combination set(s) only.
See application file for complete search history.

(56) References Cited

U.S. PATENT DOCUMENTS 8,321,271 B2    11/2012    LeFebvre
8,751,380 B2 *    6/2014    Harvey .................. G06Q 10/00
                                                                 705/14.23

(Continued)

*Primary Examiner* — Luna Champagne
(74) *Attorney, Agent, or Firm* — Finnegan, Henderson, Farabow, Garrett & Dunner, LLP

(57) ABSTRACT

The disclosed embodiments include a mobile client device for providing real-time manufacturer-based financing. In one embodiment, the mobile device is configured to receive a product code associated with a manufacturer product offered for sale at a merchant location. The mobile device may further provide the product code to a financial service provider system configured to create a manufacturer-based financial service account associated with the product manufacturer. Further, the mobile device may provide, to the financial service provider system, information associated with a received account application, where the financial service provider system may create the manufacturer-based financial service account based on the received information and the product code. The mobile device may also receive a purchase code for purchasing the product using the manufacturer-based financial service account, provide it at the merchant POS location, and receive a confirmation of product purchase.

14 Claims, 9 Drawing Sheets

Related U.S. Application Data

(60) Provisional application No. 61/846,112, filed on Jul. 15, 2013.

(51) Int. Cl.
*G06Q 20/32* (2012.01)
*G06Q 20/28* (2012.01)

(56) References Cited

U.S. PATENT DOCUMENTS

| | | |
|---|---|---|
| 8,924,246 B1 * | 12/2014 | Chen .................... G06Q 20/023 |
| | | 705/26.82 |
| 2005/0125336 A1 * | 6/2005 | Rosenblatt et al. ............ 705/39 |
| 2012/0101881 A1 * | 4/2012 | Taylor et al. ............... 705/14.13 |
| 2012/0221466 A1 * | 8/2012 | Look .............................. 705/39 |
| 2012/0271712 A1 | 10/2012 | Katzin et al. |
| 2012/0322428 A1 | 12/2012 | Lupoli et al. |
| 2013/0103482 A1 * | 4/2013 | Song et al. ................ 705/14.26 |
| 2013/0304553 A1 | 11/2013 | Hertel et al. |

* cited by examiner

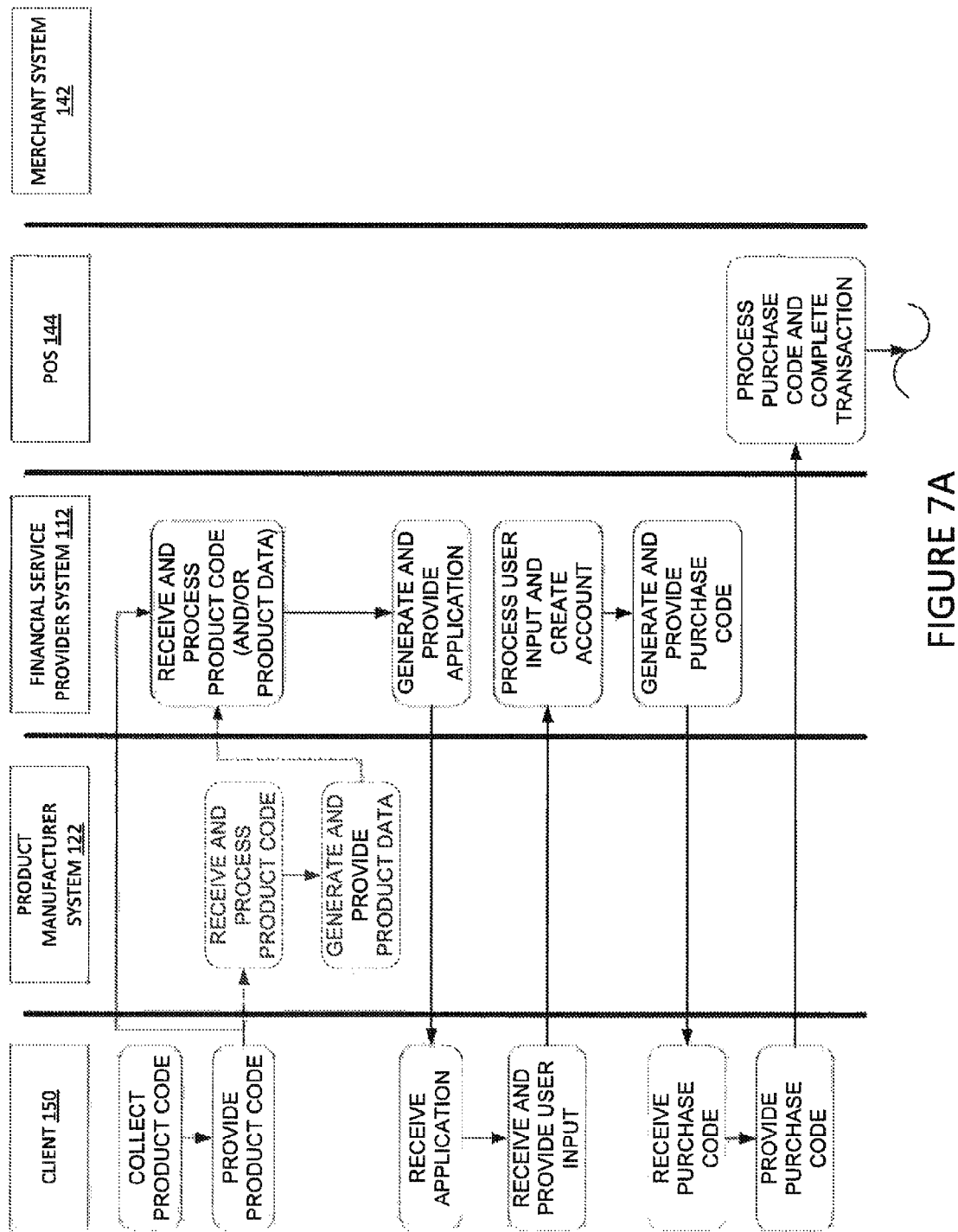

SYSTEMS AND METHODS FOR PROVIDING MANUFACTURER-BASED FINANCIAL SERVICE ACCOUNTS

PRIORITY CLAIM

This application is a continuation of U.S. patent application Ser. No. 14/330,506, filed on Jul. 14, 2014 (now allowed), which claims priority under 35 U.S.C. §119 to U.S. Provisional Application No. 61/846,112, filed on Jul. 15, 2013. The disclosures of the above-referenced applications are expressly incorporated herein by reference in their entireties.

BACKGROUND

Financial service providers, such as credit card companies, banks, and the like, issue financial service products (e.g., credit cards) both under its own brand and in partnership with other entities, such as product manufacturers or retailers (e.g., private label credit cards). Merchants have typically used private label financial service accounts to provide a direct marketing connection with their customers. For example, a merchant can promote its store locations and partnership brands through marketing efforts linked to its customers who have private label financial service accounts with the merchant.

Product manufacturers (e.g., companies that make products that merchants sell to consumers) also have a vested interest in growing their relationships with their customers, but typically lack the direct customer access and control over the point of sale that may be required to offer partnership private label financial service accounts. For example, it's very difficult for a company to incentivize consumers to provide it with their personal information when the company's product is being sold in another store (e.g., Best Buy). Methods, systems, and articles of manufacture consistent with the disclosed embodiments address these and other issues faced with product manufacturers (or other types of entities) who seek to establish or grow direct relationships with its customers.

SUMMARY

Disclosed embodiments include methods, systems, and articles of manufacture configured to, for example, providing manufacturer-based financing. In certain aspects, the disclosed embodiments may be configured to provide manufacturer-based financing in real-time, and may provide such processes during a consumer purchase session, such as when a consumer is shopping at merchant location (e.g., retail store).

In one aspect, the disclosed embodiments include a method for providing real-time manufacturer-based financing that may include receiving, by a mobile client device executing a software application configured to perform financial service processes, a product code associated with a product that is offered for sale at a merchant location, where the product is associated with a manufacturer. The method may also include providing, by the mobile client device, the product code to a financial service provider system configured to create a manufacturer-based financial service account associated with the manufacturer of the product, where the providing may be a function provided by the software application. The method may also include receiving, by the mobile client device, an account application for the manufacturer-based financial service account and providing, by the mobile client device to the financial service provider system, user input received from a user of the mobile client device, where the user input includes information associated with the account application and where the financial service provider system is configured to create the manufacturer-based financial service account for the user based on the user input and the product code. The method may also include receiving, by the mobile client device, a purchase code for purchasing the product using the manufacturer-based financial service account and providing, by the mobile client device, the purchase code to a point of sale system at the merchant location. The method may further include receiving, by the mobile client device, a confirmation of purchase of the product from the point of sale system.

The disclosed embodiments may also include a mobile client device for providing real-time manufacturer-based financing. In one aspect, the device may include a memory storing software instructions, the software instructions including a mobile financial service application configured to perform financial service processes, and one or more processors configured to execute the software instructions to receive a product code associated with a product that is offered for sale at a merchant location, where the product is associated with a manufacturer. The one or more processors may also provide the product code to a financial service provider system configured to create a manufacturer-based financial service account associated with the manufacturer of the product, wherein the providing is a function provided by the software application and receive an account application for the manufacturer-based financial service account. The one or more processors may further provide, to the financial service provider system, user input received from a user of the mobile client device, where the user input includes information associated with the account application and where the financial service provider system is configured to create the manufacturer-based financial service account for the user based on the user input and the product code. In another aspect, the one or more processors may receive a purchase code for purchasing the product using the manufacturer-based financial service account, provide the purchase code to a point of sale system at the merchant location, and receive a confirmation of purchase of the product from the point of sale system.

The disclosed embodiments also include systems that perform operations consistent with the functionalities exemplified above from the perspective of a financial service provider system, manufacturer system, or other systems remote from the merchant location and the mobile client device.

Aspects of the disclosed embodiments may include tangible computer-readable media that stores software instructions that, when executed by one or more processors, are configured to and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments.

FIGS. 7A and 7B are process flow diagrams of an exemplary process, consistent with disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
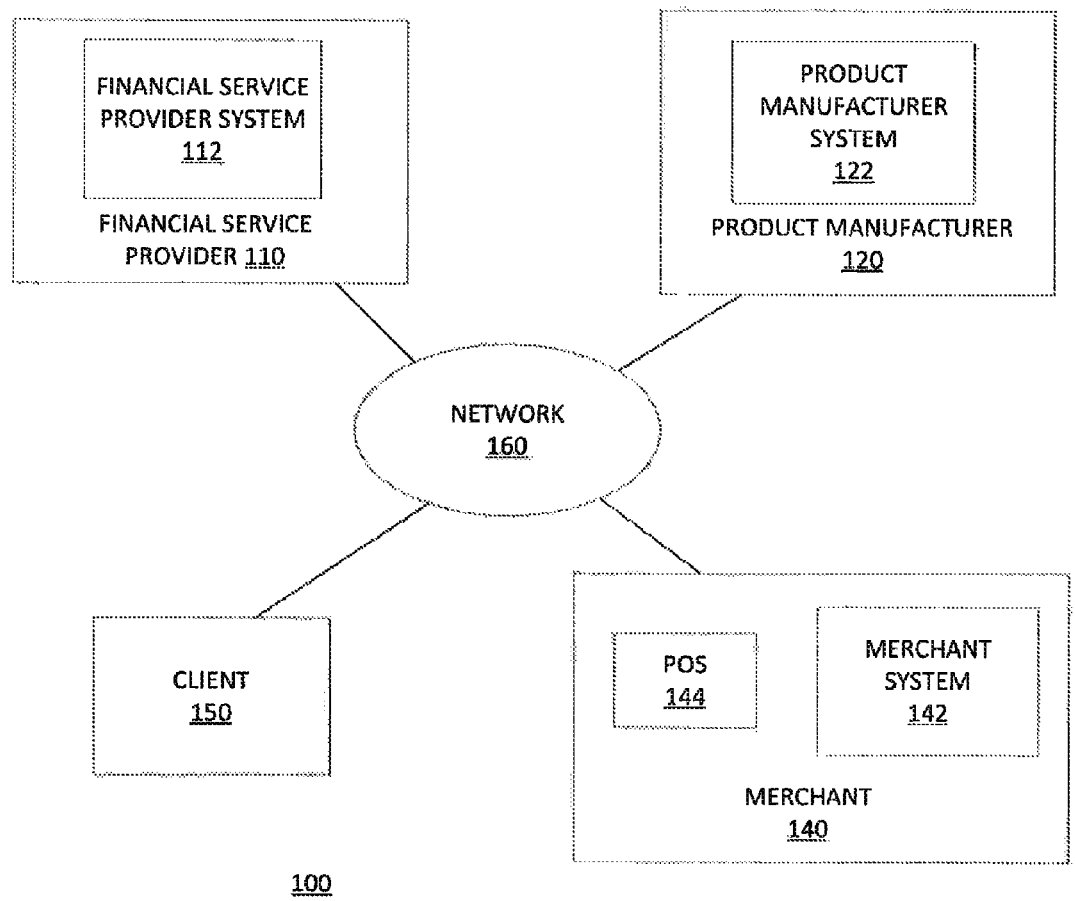
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more financial service providers 110, one or more product manufacturers 120, one or more merchants 140, one or more clients 150, and network 160. The components and arrangement of the components included in system 100 may vary. Thus, system 100 may include other components that perform or assist in the performance of one or more processes consistent with the disclosed embodiments.

Components of system 100 may be computing systems configured to perform manufacturer-based financing processes, consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100; including systems associated with financial service provider 110, manufacturer 120, merchant 140, and/or client 150. In certain aspects, users may operate one or more components of system 100 to initiate and provide input for one or more operations performed by the disclosed embodiments.

Financial service provider 110 may be an entity that provides, maintains, manages, or otherwise offers financial services. For example, financial service provider 110 may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, and the like. Consistent with certain disclosed embodiments, financial service provider 110, using financial service provider system 112, may provide manufacturer-based financial service accounts, which may be financial service accounts that associated with a manufacturer of products or services, such as a product manufacturer 120. For example, financial service provider 110 may provide financial services for a credit card account that is branded with a manufacturer, such as a private label credit card branded with a manufacturer.

Financial service provider 110 may include one or more financial service provider systems 112. In one aspect, financial service provider system 112 may be one or more computing devices configured to perform one or more operations consistent with disclosed embodiments. In one aspect, financial service provider system 112 may be a desktop computer, a server, or any other type of computing device. Financial service provider system 112 may include one or more processors configured to execute software instructions stored in memory. The one or more processors may be configured to execute software instructions that when executed by a processor performs known Internet-related communication and financial service-based processes. For instance, financial service provider system 112 may execute software that provides data used for generating and displaying interfaces including content on a display device included in, or connected to, client 150. The disclosed embodiments are not limited to any particular configuration of financial service provider system 112.

Product manufacturer 120 may be an entity that manufacturers, develops, provides, or otherwise offers one or more products. For example, product manufacturer 120 may be an electronics product manufacturer, such as Sony™, Apple™, Dell™, Panasonic™, etc. Product manufacturer 120 may additionally or alternatively be a provider of other types of products, such as clothing, household items, toys, and any other type of product. The disclosed embodiments are not limited to any particular type of manufacturer or product.

Product manufacturer 120 may include one or more product manufacturer systems 122. In one aspect, product manufacturer system 122 may be one or more computing devices configured to perform one or more operations consistent with disclosed embodiments. In one aspect, product manufacturer system 122 may be a desktop computer, a server, or any other type of computing device. Product manufacturer system 122 may include one or more processors configured to execute software instructions stored in memory. The one or more processors may be configured to execute software instructions that when executed by a processor performs known Internet-related communication and other types of processes. For instance, product manufacturer system 122 may execute software that provides data used for generating and displaying interfaces including content on a display device included in, or connected to, client 150. The disclosed embodiments are not limited to any particular configuration of product manufacturer system 122. In certain embodiments, product manufacturer 120 may include components and infrastructure to provide financial services and financial service accounts consistent with the disclosed embodiments. For example, product manufacturer 120 may include a financial service provider system 112 that performs functions and operations consistent with those disclosed herein for financial service provider system 112.

Product manufacturer 120 and financial service provider 110 may provide one or more web sites or online portals that are accessible by client 150 over network 160.

Merchant 140 may be an entity that offers provides goods, services, and/or information, such as a retailer (e.g., Macy's®, Target®, etc.), grocery store, service provider (e.g., utility company, etc.), or any other type of entity that provides goods, services, and/or information that consumers (e.g., end-users or other business entities, such as user 152) may purchase, consume, use, etc. Merchant 140 may offer for sale one or more products of product manufacturer 120. In one example, merchant 140 may be associated with a merchant brick and mortar location(s) that a consumer (e.g., a user of client 150) may physically visit and purchase a product. Merchant 140 may also include back and/or front-end computing components that store data and execute software instructions to perform operations consistent with disclosed embodiments, such as computers that are operated by employees of the merchant (e.g., back office systems, etc.).

Merchant 140 may include merchant system 142 and one or more Point of Sale (POS) systems 144. Merchant system 142 may include one or more computing systems, such as server(s), desktop computers, etc., that are configured to execute stored software instructions to perform operations associated with a merchant, including one or more processes associated with processing purchase transactions, generating transaction data, generating product data (e.g., SKU data) relating to purchase transactions, etc. Merchant system 142 may perform one or more operations consistent with the disclosed embodiments. The disclosed embodiments are not limited to any particular configuration of merchant system 142

POS 144 may be one or more point of sale terminals that include computing components to perform known point of sale operations, such as performing purchase transactions with consumers. POS 144 may be configured to execute one or more software instructions to perform operations consistent with the disclosed embodiments, including, for example, interacting with client 150 to complete purchase transactions of products offered for sale by merchant 140.

Client 150 may be one or more computing devices configured to perform one or more operations consistent with disclosed embodiments. Client 150 may be a desktop computer, a laptop, a server, a mobile device (e.g., tablet, smart phone, etc.), or any other type of computing device. For exemplary purposes, aspects of the disclosed embodiments are described with reference to client 150 as a mobile client device, such as a smart phone, tablet, or the like. As mentioned herein, however, the disclosed embodiments are not limited to such examples.

Client 150 may include one or more processors configured to execute software instructions stored in memory, such as memory included in client 150. Client 150 may include software that when executed by a processor performs known Internet-related communication, content display processes, and financial service-related processes for a user of client 150. For instance, client 150 may execute browser or related mobile display software that generates and displays interfaces including content on a display device included in, or connected to, client 150. Client 150 may be a mobile device that executes mobile device applications and/or mobile device communication software that allows client 150 to communicate with components over network 160, and generates and displays content in interfaces via a display device included in client 150. The disclosed embodiments are not limited to any particular configuration of client 150. For instance, client 150 may be a mobile device that stores and executes mobile applications that provide financial service related functions offered by financial service provider system 112 and/or product manufacturer system 122, such as a mobile banking application for checking balances, paying bills, or for performing financial transactions, such as mobile payments with point of sale (POS) 144 or similar components, etc. In certain embodiments, client 150 may be configured to execute software instructions relating to location services, such as GPS locations. For example, client 150 may be configured to determine a geographic location of client 150 (and associated user) and provide location data and time stamp data corresponding to the location data.

In one embodiment, a user may use client 150 to perform one or more operations consistent with the disclosed embodiments. In one aspect, the user may be a customer of a financial service provider 110 providing financial service accounts. For instance, financial service provider 110 may maintain a financial service account (e.g., credit card account) for the user that the user may use to purchase products online or at brick and mortar locations associated with merchant 140. In other embodiments, the user may be a potential customer of financial service provider 110 and/or product manufacturer 120 or may not be affiliated with such a financial service provider or manufacturer from the user's perspective and/or the financial service provider's or product manufacturer's perspective.

In certain aspects, client 150 may be a computing device that stores and executes applications and/or communication software that allows client 150 to communicate with components over network 160. Client 150 may also execute applications and/or communication software to perform financial transaction processes, including payment methods, such as near field communication (NFC), optical payment methods such as QR codes, audio-based payment methods, internet-based payment method, SMS payment methods, or other payment methods known in the art. The disclosed embodiments are not limited to any particular configuration of client 150.

Network 160 may be any type of network configured to provide communications between components of system 100. For example, network 160 may be any type of network (including infrastructure) that provides communications, exchanges information, and/or facilitates the exchange of information, such as the Internet, a Local Area Network, NFC, Optical code scanner, or other suitable connection(s) that enables the sending and receiving of information between the components of system 100. In other embodiments, one or more components of system 100 may communicate directly through a dedicated communication link(s), such as links between financial service provider 110, client 150, product manufacturer 120, and merchant 140.

It is to be understood that the configuration and boundaries of the functional building blocks of system 100 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, financial service provider system 112 and product manufacturer system 122 may constitute a part of components of system 100 other than those specifically described, or may constitute a part of multiple components of system 100 (i.e., a distributed system). Such alternatives fall within the scope and spirit of the disclosed embodiments.

Figure 1B:
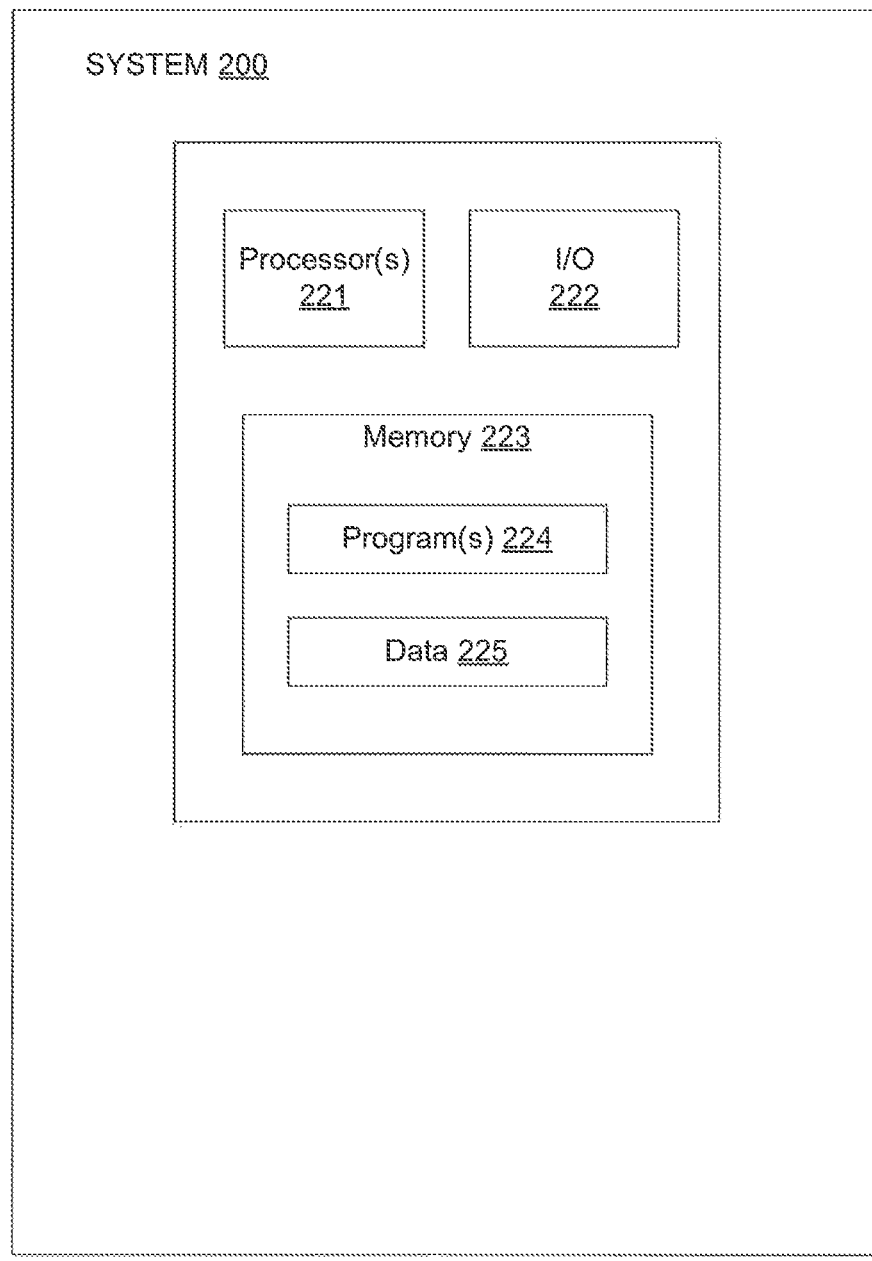
FIG. 1B is a diagram of an exemplary client, consistent with disclosed embodiments.

FIG. 1B shows an exemplary client 150 consistent with disclosed embodiments. In one embodiment, client 150 may include system 200 comprising one or more processors 221, one or more input/output (I/O) devices 222, and one or more memories 223. In some embodiments, client 150 may take the form of a mobile computing device such as a smartphone or tablet, a general purpose computer, or any combination of these components. Alternatively, client 150 may be configured as a particular apparatus, embedded system, dedicated circuit, and the like based on the storage, execution, and/or implementation of the software instructions that perform one or more operations consistent with the disclosed embodiments. According to some embodiments, client 150 may comprise web browsers(s) or mobile content capturing and rendering software and components that access web site(s), mobile application processes, etc. consistent with disclosed embodiments.

Processor 221 may include one or more known processing devices, such as mobile device microprocessors or any various other processors. The disclosed embodiments are not limited to any type of processor(s) configured in client 150.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the client 150, or program 224 may comprise multiple programs. Memory 223 may also store data 225 that is used by one or more programs 312.

In certain embodiments, memory 223 may store a mobile banking application that may be executed by processor(s) 221 to perform one or more mobile banking application processes consistent with disclosed embodiments. For example, the mobile banking application may be provided by a financial service provider system 112 or another system associated with a financial service provider 110 that provides financial accounts held by a user.

I/O devices 222 may be one or more devices configured to allow data to be received and/or transmitted by client 150. I/O devices 222 may include one or more digital and/or analog devices that allow client 150 to communicate with other machines and devices, such as other components of system 100. For example, I/O devices 222 may include a screen for displaying optical payment methods, such as QR codes, or providing information to the user. I/O devices 222 may also include components for NFC communication. I/O devices 222 may also include one or more digital and/or analog devices that allow a user to interact with client 150 such as a touch-sensitive area, buttons, or microphones. I/O devices 304 may also include other components known in the art for interacting with a user, merchant system 142, POS 144. I/O device 222 may include scanning mechanisms and related software for scanning product codes displayed on a product, a product package, and/or signs located at a merchant location or located outside of a merchant location (e.g., sale signs, posters, cards, etc.).

The components of client 150 may be implemented in hardware, software, or a combination of both hardware and software, as will be apparent to those skilled in the art. For example, although one or more components of client 150 may be implemented as computer processing instructions, all or a portion of the functionality of client 150 may be implemented instead in dedicated electronics hardware.

In certain aspects, a user of client 150 may physically visit a merchant location of merchant 140 to perform a consumer purchase session (e.g., a time frame involving when the user enters the merchant location and leaves the merchant location, which may or may not involve the purchase of one or more products offered for sale by merchant 140). Aspects of the disclosed embodiments provide mechanisms and processes for allowing the user, using client 150, to scan or otherwise collect product code(s) about a product that the user may be interested in purchasing during the consumer purchase session. Based on the collected product code, the user may apply for and receive a financial service account from the product manufacturer of the desired product (or through a financial service account provider that provides financial services on behalf of the manufacturer) in real-time or substantially real-time (e.g., while the user is still in the merchant location during the consumer purchase session). Aspects of the disclosed embodiments may allow the user to receive purchase code data that is displayed on client 150 and can be used to purchase the desired product at a POS 144 using the newly approved and created manufacturer-based financial service account. In certain embodiments, the disclosed processes and systems enable a product manufacturer to have more direct relationships with a consumer of its products by offering discounts or incentives for purchasing the product using a financial service account branded or offered by the manufacturer.

Figure 2:
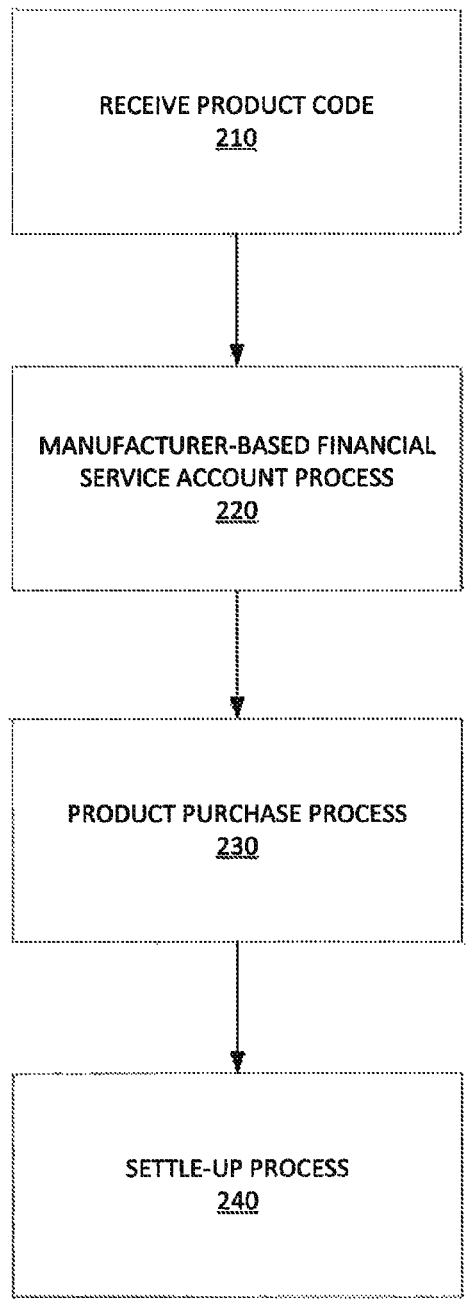
FIG. 2 is a flow chart of an exemplary manufacturer-based financing process, consistent with disclosed embodiments.

FIG. 2 shows a flowchart of an exemplary merchant-based financial service process, consistent with disclosed embodiments.

In step 210, client 150 may receive a product code associated with a product offered for sale by merchant 140, the product being associated with product manufacturer 120. In one aspect, step 210 may be performed by client 150, in which case the process may involve collecting the product code using software and/or components included and executed by client 150. For example, a user of client 150 may use client 150 to scan a product code that is affixed on the product, on the packaging for the product, or on a sign or similar display surface that includes the product code. In certain aspects, the product code may be provided in a form that is able to be scanned, read, collected, or otherwise received by client 150 using known information collection processes (e.g., barcode, product label codes, etc.). One of ordinary skill in the art would understand that any type of coding format and/or method of coding information may be implemented by the disclosed embodiments to reflect the product code. In certain embodiments, the product code may include information describing the product (e.g., SKU data). It may also include the price of the product. It may also include incentive data that may be used to adjust the price of the product. For example, the incentive data may include a discount (e.g., percentage or dollar amount discounts) that the user may receive if they purchase the product using a manufacturer-based financial service account that is provided to the user using processes and system consistent with the disclosed embodiments.

In certain aspects, client 150 may execute a mobile application that enables the user to collect the product code for the product using client 150. Client 150 may display an interface on a display device that instructs the user to initiate and perform the product code collection such that the product code is received from the product code affixed to the product, product package, or elsewhere.

Financial service provider system 112 may receive the product code from client 150 (e.g., step 210). In certain aspects, product manufacturer system 122 may receive the product code, where product manufacturer system 122 is configured to perform operations consistent with those disclosed herein regarding financial service provider system 112. In certain embodiments, the operations and functions of financial service provider system 112 may be performed by product manufacturer system 122. Based on the received product code, financial service provider system 112 may perform a manufacturer-based financial service account process (e.g., step 220). Exemplary aspects of the manufacturer-based financial service account process are disclosed below. In one embodiment, the manufacturer-based financial service account process may provide and approve a manufacturer-based financial account for the user, where the account is an account provided by, or branded or affiliated with the manufacturer of the product (e.g., product manufacturer 120). The manufacturer-based financial service account process may return a purchase code to client 150 that is stored and/or displayed on client 150.

In step 230, the product purchase process may be performed. Exemplary aspects of this process are disclosed below. In one example, the product purchase process may include the user presenting the purchase code displayed by client 150 to POS 144 to complete the purchase transaction of the product using the manufacturer-based financial service account newly created for the user during the manufacturer-based financial service account process.

In step 240, the disclosed embodiments may perform a settle-up process between the merchant 140 and the financial service provider 110 (or product manufacturer 120) for the purchase of the product. This process may include performing known financial service processes for compensating merchant 140 for the product sale.

Figure 3:
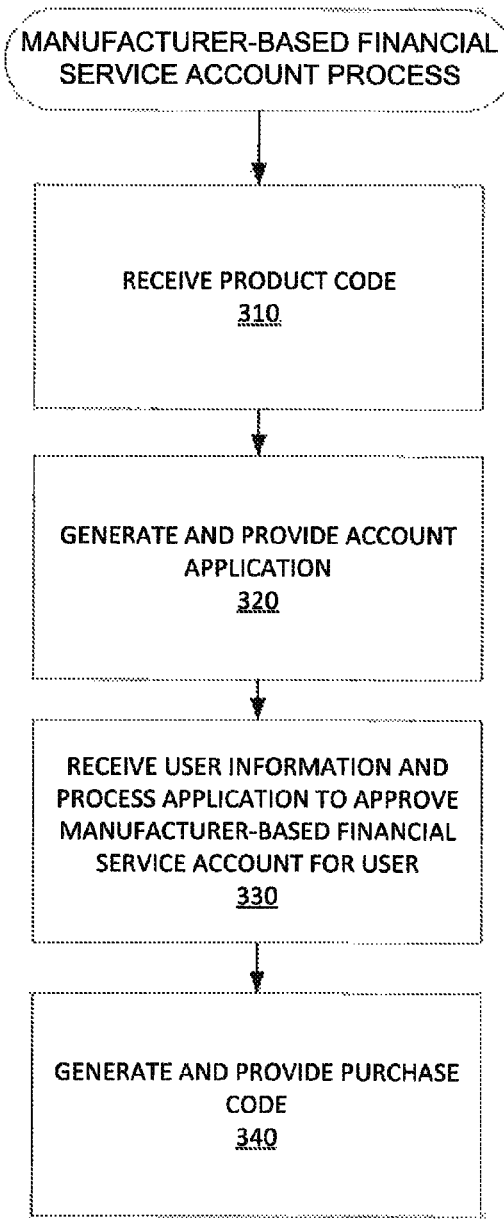
FIG. 3 is a flow chart of an exemplary manufacturer-based financial service account process, consistent with disclosed embodiments.

FIG. 3 shows a flowchart of an exemplary manufacturer-based financial service account process, consistent with disclosed embodiments. In one aspect, financial service provider system 112 may receive the product code collected by client 150 (e.g., step 310). Based on the product code, financial service provider system 112 may generate and provide an account application for a manufacturer-based financial service account (e.g., step 320). In one aspect, the manufacturer-based financial service account may be a credit card account or similar type of financial service account that is branded or otherwise associated with product manufacturer 120 of the product to be purchased by the user. In one example, financial service provider system 112 may generate and provide data and instructions to client 150 to cause client 150 to display an online credit application that requests user input (e.g., demographic information, personal information, and other known credit application information). The user, through client 150, may provide user information in response to the account application. Client 150 may collect and provide the user information to financial service provider system 112.

Figure 4:
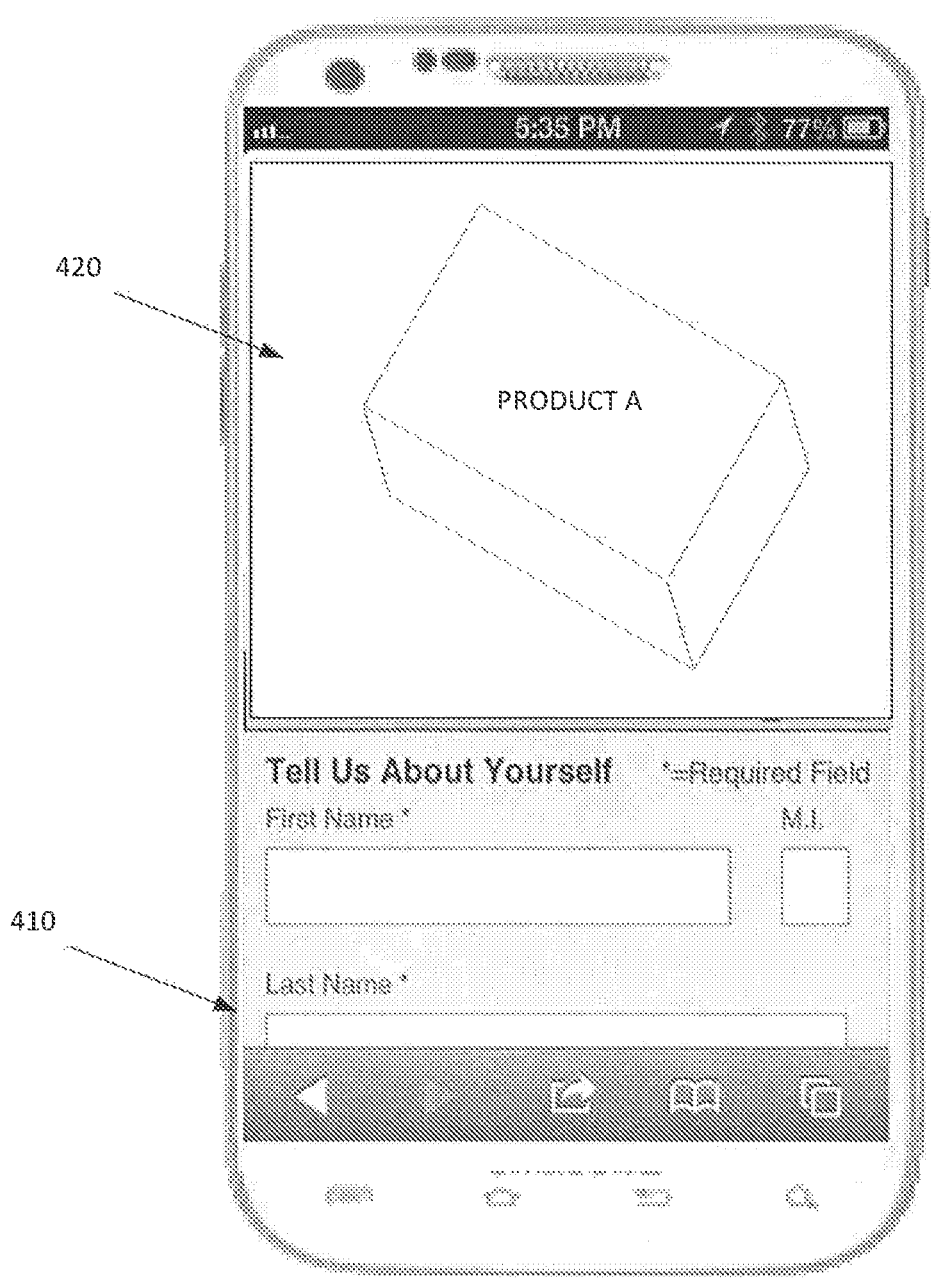
FIG. 4 is a diagram of an exemplary client including an interface displaying information consistent with disclosed embodiments.

FIG. 4 shows an exemplary client (which may correspond to client 150) that includes a display interface 420 that shows a graphical image (photograph, etc.) of the product associated with the product code collected by client 150. The exemplary client may also include a display interface 410 that includes the account application requests that the user may provide user input.

In step 330, financial service provider system 112 may receive the user information and process the account application to determine whether to approve the account application. Financial service provider system 112 may execute software instructions to perform known credit application processes to determine whether the user is approved, and to determine the parameters for the manufacturer-based financial service account (e.g., credit limit, APR, penalty fees and conditions, incentives, reward points, etc.). In one aspect, if the user is approved, financial service provider system 112 may also process one or more incentives that may be offered for the product based on the received product code form client 150.

In one embodiment, financial service provider system 112 may generate and provide to client 150 a purchase code (e.g., step 340). In one aspect, the purchase code may include information that may be used by POS 144 (or other component) to complete the purchase transaction of the product. For example, the purchase code may include a barcode or similar data configuration that is displayed on client 150 and can be scanned or otherwise collected by POS 144 over wireless communications (e.g., bar code scanner, etc.). In other aspects, financial service provider system 112 may also include with, or provide separately, information associated with the approved and created manufacturer-based financial service account for the user. For example, financial service provider system 112 may provide data that includes the financial service account parameters (e.g., table format, a hyperlink to access the financial service account information, etc.). In another example, financial service provider system 112 may provide data that may be used by client 150 to display a graphical image of the front face of a manufacturer-based financial service account card, including the brand name of product manufacturer 120, account number, user name, expiration data, etc.

Figure 6:
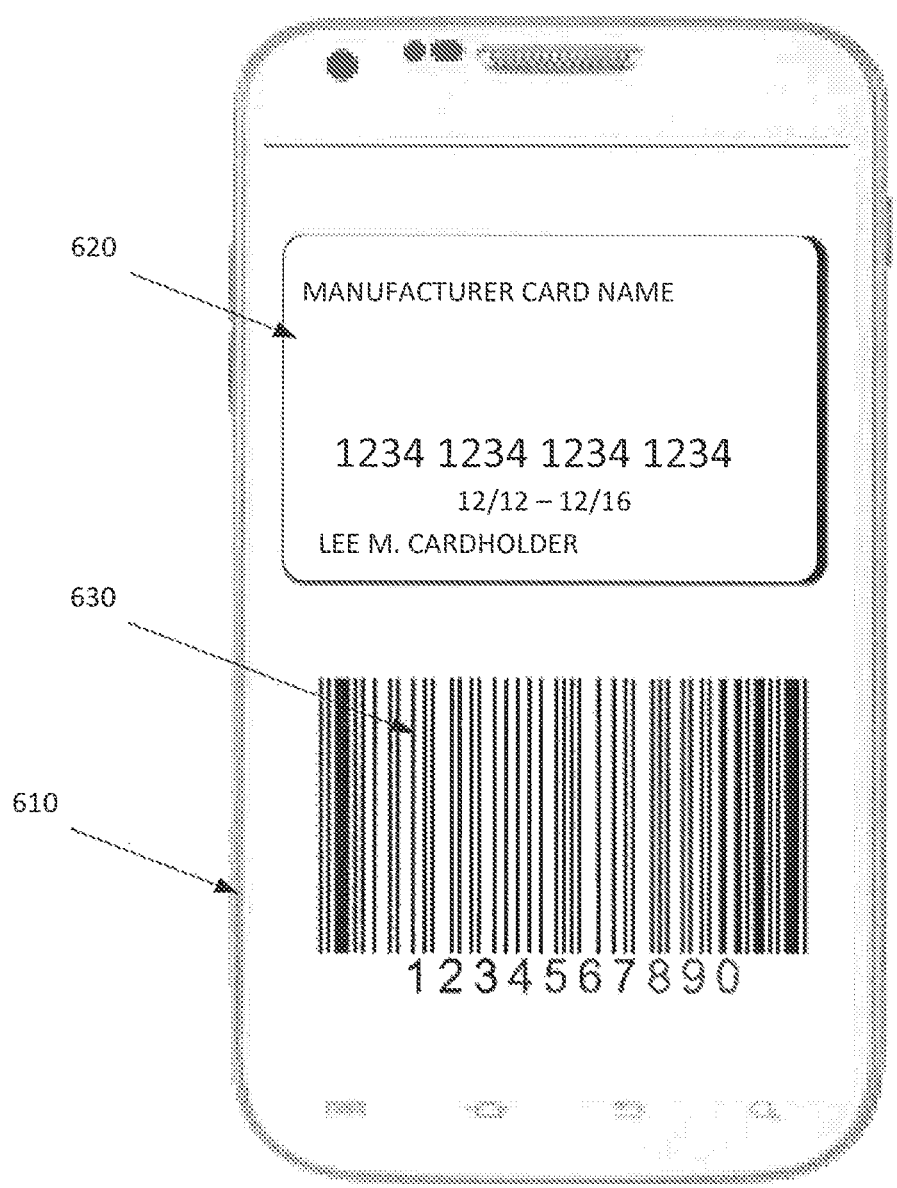
FIG. 6 is a diagram of an exemplary client including an interface displaying purchase code information consistent with disclosed embodiments.

FIG. 6 shows an exemplary client 610 (which may correspond to client 150) that includes interfaces displayed by the client. For example, client 610 may include an interface 620 that includes a graphical image of the manufacturer-based financial service account created for the user. Client 610 may also include an exemplary purchase code 630, which in this example is a bar code that may be scanned or otherwise collected by POS 144 or other device.

Figure 5:
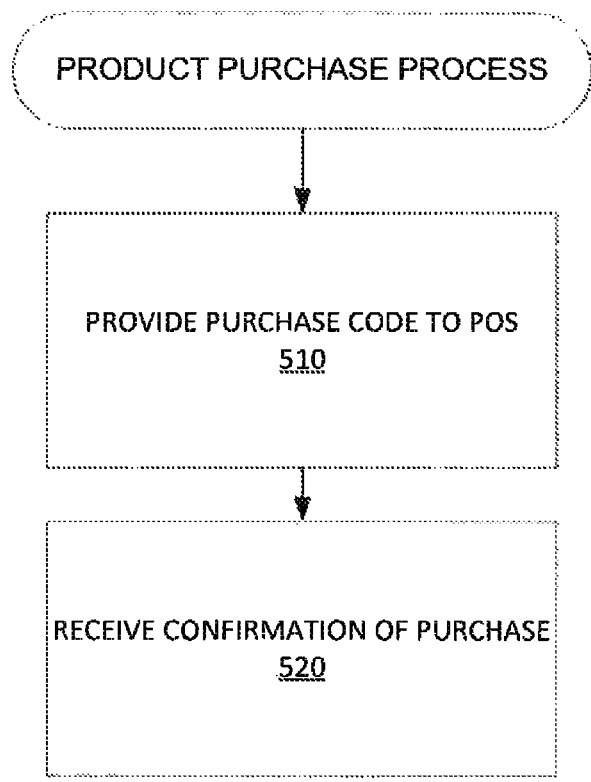
FIG. 5 is a flow chart of an exemplary product purchase process, consistent with disclosed embodiments.

At some point during the consumer purchase session, the user of client 150 may take the product to a POS 144 to purchase the product. FIG. 5 shows a flowchart of an exemplary product purchase process consistent with disclosed embodiments. In one example, client 150 may provide the purchase code to POS 144 (e.g., step 510). In one aspect, the user may present the purchase code displayed by client 150 to POS 144, such that POS 144 may scan or otherwise collect the purchase code from client 150.

Based on the received purchase code, POS 144 may perform a purchase transaction process that completes the purchase transaction of the product for the purchase price (less any incentives offered by the product manufacturer). Client 150 may receive a confirmation of the purchase from POS 144 electronically (e.g., step 520). The user may later exit the merchant location and complete the consumer purchase session.

At some point, POS 144 may provide purchase transaction information for the purchase transaction to merchant system 142. Merchant system 142 may then communicate with financial service provider system 112 (or manufacturer system 122) to settle-up for the sale of the product to make merchant 140 whole for the sale of the product. In one aspect, financial service provider system 112 may perform operations to provide funds to merchant system 122 (or other component) for the purchase price of the product, or a variation of the purchase price based on, for example, agreements between merchant 140 and financial service provider 110 and/or product manufacturer 120.

Figure 7B:
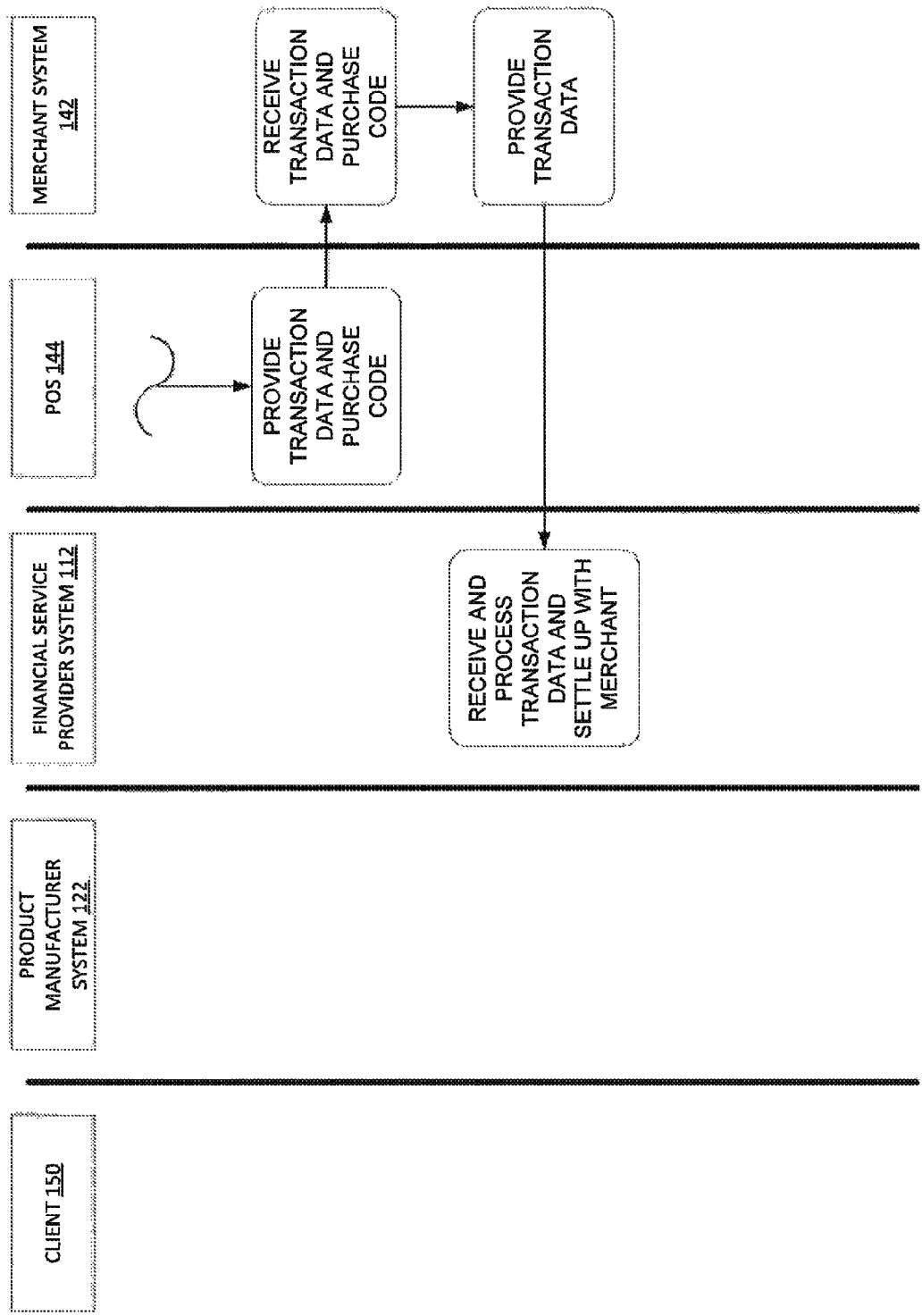

FIGS. 7A and 7B show process flows for manufacturer-based financial service processes consistent with disclosed embodiments. FIGS. 7A and 7B show at the top row the components that may be involved with certain operations of the manufacturer-based financial service processes consistent with disclosed embodiments. In each column below the disclosed components, exemplary operations are shown that reflect exemplary operations that may be performed by the respective component. The flow of information or data is shown through arrowed lines between different components. In one example, product manufacturer system 122 may perform optional operations, shown as dotted operations and arrowed lines in FIG. 7A. In such optional or alternative operations, product manufacturer system 122 may receive and process the product code collected by client 150. Based on the processed product code, product manufacturer system 122 may generate and provide product data to financial service provider system 112. The product data may include information such as the price of the product, images or graphical data reflecting the product, incentive data for the product, and any other information relating to the product (e.g., SKU data, description data, etc.). In these embodiments, financial service provider system 112 may use the product data provided by product manufacturer system 122 to generate the account application for the manufacturer-based financial service account offered to the user, and/or for generating the purchase code used to purchase the product via client 150.

It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed:

1. A computer-implemented method for providing real-time manufacturer-based financing, comprising:
    receiving, from a mobile client device by a financial service provider system, a product code associated with a product that is offered for sale at a merchant location, wherein:
        the product and the financial service provider system are associated with a manufacturer;
        the product code is affixed to at least one of the product, packaging for the product, a sign positioned in the merchant location, and a sign positioned outside the merchant location; and
        receiving the product code includes receiving information collected using at least one of a bar code scanner mechanism, near-field communication, and short-range wireless technology;
    initiating, by the financial service provider system, creation of a manufacturer-based financial service account associated with the manufacturer of the product;
    providing, to the mobile client device by the financial service provider system, an account application for the manufacturer-based financial service account;
    receiving, from the mobile client device, user input of a user associated with the mobile client device, wherein the user input includes information associated with the account application;
    approving, based on the user input, a purchase of the product with the manufacturer-based financial service account; and
    providing, to the mobile client device, a purchase code identifying the manufacturer-based financial service account, the purchase code formatted for collection by a point of sale system and configured for purchasing the product using the manufacturer-based financial service account.

2. The method of claim 1, wherein the product code includes at least information describing the product and information related to a price of the product.

3. The method of claim 1, wherein providing the purchase code includes providing information relating to the manufacturer-based financial service account of the user.

4. The method of claim 3, wherein the information relating to the manufacturer based financial service account of the user includes a graphical image of a financial service account card for the manufacturer-based financial service account of the user.

5. The method of claim 1, wherein providing the purchase code to the mobile client device includes providing instructions to display the purchase code on a display device of the mobile client device such that the point of sale system can collect data reflecting the purchase code from the displayed purchase code.

6. A financial service provider system associated with a manufacturer for providing real-time manufacturer-based financing, comprising:
    a memory storing software instructions, and
    one or more processors configured to execute the software instructions to:
        receive, from a mobile client device, a product code associated with a product that is offered for sale at a merchant location, wherein:
            the product is associated with a manufacturer;
            the product code is affixed to at least one of the product, packaging for the product, a sign positioned in the merchant location, and a sign positioned outside the merchant location; and
            receiving the product code includes receiving information collected using at least one of a bar code scanner mechanism, near-field communication, and short-range wireless technology;
        initiate creation of a manufacturer-based financial service account associated with the manufacturer of the product;
        provide, to the mobile client device, an account application for the manufacturer-based financial service account;
        receive, from the mobile client device, user input of a user associated with the mobile client device, wherein the user input includes information associated with the account application;
        approve, based on the user input, a purchase of the product with the manufacturer-based financial service account; and
        provide, to the mobile client device, a purchase code identifying the manufacturer-based financial service account, the purchase code formatted for collection by a point of sale system and configured for purchasing the product using the manufacturer-based financial service account.

7. The financial service provider system of claim 6, wherein providing the purchase code includes providing information relating to the manufacturer-based financial service account of the user.

8. The financial service provider system of claim 7, wherein the information relating to the manufacturer-based financial service account of the user includes a graphical image of a financial service account card for the manufacturer-based financial service account of the user.

9. The financial service provider system of claim 6, wherein the one or more processors are configured to provide the purchase code to the mobile client device by providing instructions to display the purchase code on a display device of the mobile client device such that the point of sale system can collect data reflecting the purchase code from the displayed purchase code.

10. A non-transitory computer readable medium storing software instructions, that when executed by one or more processors of a financial service provider system, configures the one or more processors to:
receive, from a mobile client device, a product code associated with a product that is offered for sale at a merchant location, wherein:
the product is associated with a manufacturer;
the product code is affixed to at least one of the product, packaging for the product, a sign positioned in the merchant location, and a sign positioned outside the merchant location; and
receiving the product code includes receiving information collected using at least one of a bar code scanner mechanism, near-field communication, and short-range wireless technology;
initiate creation of a manufacturer-based financial service account associated with the manufacturer of the product, the financial service provider system associated with the manufacturer;
provide, to the mobile client device, an account application for the manufacturer-based financial service account;
receive from the mobile client device, user input of a user associated with the mobile client device, wherein the user input includes information associated with the account application;
approve, based on the user input, a purchase of the product with the manufacturer-based financial service account; and
provide, to the mobile client device, a purchase code identifying the manufacturer-based financial service account, the purchase code formatted for collection by a point of sale system and configured for purchasing the product using the manufacturer-based financial service account.

11. The medium of claim 10, wherein the product code includes at least information describing the product and information related to a price of the product.

12. The medium of claim 10, wherein providing the purchase code includes providing information relating to the manufacturer-based financial service account of the user.

13. The medium of claim 12, wherein the information relating to the manufacturer based financial service account of the user includes a graphical image of a financial service account card for the manufacturer-based financial service account of the user.

14. The medium of claim 10, wherein the one or more processors are configured to provide the purchase code to the point of sale system by providing instructions to display the purchase code on a display device of the mobile client device such that the point of sale system can collect data reflecting the purchase code from the displayed purchase code.

* * * * *